United States Patent [19]

Makino et al.

[11] Patent Number: 4,619,881

[45] Date of Patent: Oct. 28, 1986

[54] PHOTOCONDUCTIVE COMPOSITION AND ELECTRO-PHOTOGRAPHIC LIGHT-SENSITIVE MATERIAL CONTAINING A TRISAZO COMPOUND

[75] Inventors: Naonori Makino; Seiji Horie; Hideo Sato, all of Kanagawa, Japan

[73] Assignee: Fuji Photo Film Co., Ltd., Kanagawa, Japan

[21] Appl. No.: 703,968

[22] Filed: Feb. 21, 1985

[30] Foreign Application Priority Data

Feb. 21, 1984 [JP] Japan ................... 59-30918

[51] Int. Cl.⁴ .............................. G03G 5/06
[52] U.S. Cl. .......................... 430/77; 430/58
[58] Field of Search .............. 430/58, 59, 70, 71, 430/72, 73, 74, 75, 76, 77, 78, 79

[56] References Cited

U.S. PATENT DOCUMENTS 4,279,981  7/1981  Ohta et al. .................. 430/76
4,427,753  1/1984  Fujimura et al. ............ 430/76

Primary Examiner—John L. Goodrow
Attorney, Agent, or Firm—Sughrue, Mion, Zinn, Macpeak & Seas

[57] ABSTRACT

A photoconductive composition is disclosed, containing at least one trisazo compound represented by the following general formula (1):

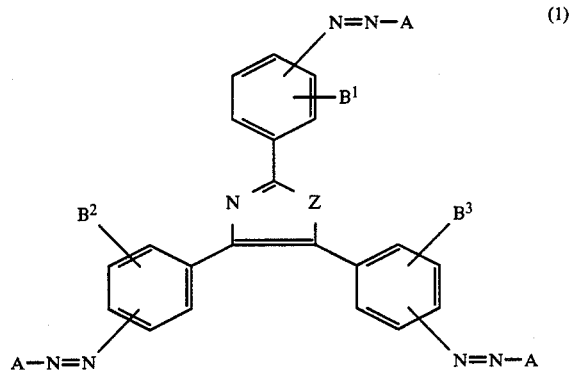

wherein Z represents

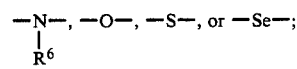

$R^6$ represents a hydrogen atom, a lower alkyl group, an aryl group, an aryloxy group, an alkoxycarbonyl group, an aryloxycarbonyl group, an acyl group, or a substituted group of them; As′, which may be the same or different, each represents (Abstract continued on next page.)

-continued

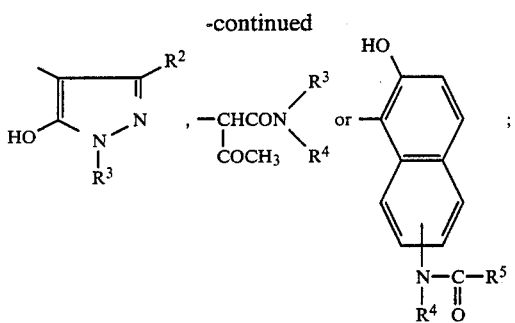

$B^1$, $B^2$ and $B^3$ each represents a hydrogen atom, a halogen atom, a lower alkyl group, a lower alkoxy group or a substituted lower alkyl group or lower alkoxy group, and $B^1$, $B^2$ and $B^3$ may be identical or different; X represents an atomic group necessary to form an aromatic ring or heterocyclic ring, which may be substituted or unsubstituted, by condensing with the benzene ring to which the hydroxyl group and Y are bonded; Y represents

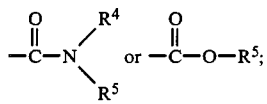

$R^1$ represents an alkyl group, a phenyl group or a substituted alkyl or phenyl group; $R^2$ represents a hydrogen atom, a lower alkyl group, a carbamoyl group, a carboxyl group, an alkoxycarbonyl group, an aryloxycarbonyl group or a substituted or unsubstituted amino group; $R^3$ represents an alkyl group, an aromatic group or a heteroaromatic group or a substituted alkyl group, aromatic group or heteroaromatic group; and $R^4$ and $R^5$, which may be the same or different, each represents a hydrogen atom, an alkyl group, an aromatic group, a heteroaromatic group or a substituted alkyl group, aromatic group or heteroaromatic group, provided that $R^4$ and $R^5$ are not both hydrogen atoms, and $R^5$ is not a hydrogen atom when Y is

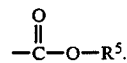

An electrophotographic light-sensitive material is also disclosed, comprising an electrically conductive base and a layer containing an electric charge carrier transport compound and the trisazo compound as an electric charge carrier generating compound.

15 Claims, 1 Drawing Figure

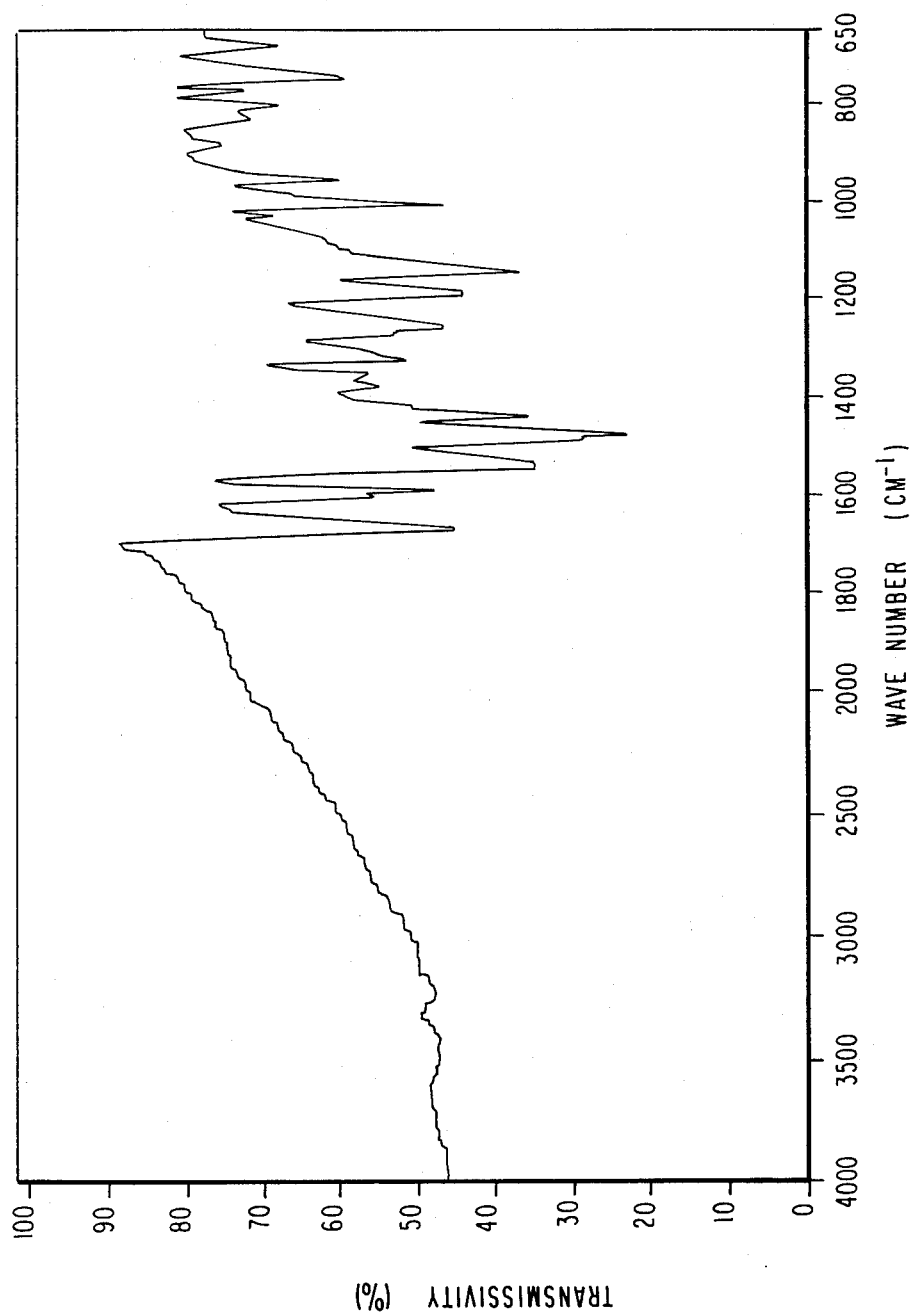

PHOTOCONDUCTIVE COMPOSITION AND ELECTRO-PHOTOGRAPHIC LIGHT-SENSITIVE MATERIAL CONTAINING A TRISAZO COMPOUND

FIELD OF THE INVENTION

The present invention relates to a photoconductive composition containing a novel trisazo compound and an electrophotographic light-sensitive material having an electrophotographic light-sensitive layer containing the trisazo compound.

BACKGROUND OF THE INVENTION

A photoconductive process using an electrophotographic light-sensitive material includes a first step of generating electric charges by exposure and a second step of transporting the electric charges.

These steps can be conducted in a single substance such as selenium light-sensitive plate. Alternatively, the two steps can be performed in different substances such as by using a combination of amorphous selenium and poly-N-vinylcarbazole for the first and second step, respectively. The process in which the steps are conducted in different substances has the advantage that the substances used for electrophotographic light-sensitive materials can be selected from an expanded group and, consequently, electrophotographic characteristics such as sensitivity or accepting electric potential of the electrophotographic light-sensitive materials can be improved. Substances suitable for producing the coated film in the electrophotographic light-sensitive materials can also be selected from a wide variety of such substances.

Conventional photoconductive substances for electrophotographic light-sensitive materials used in electrophotography have included inorganic substances such as selenium, cadmium or zinc oxide.

Electrophotography, as disclosed in U.S. Pat. No. 2,297,691 to Carlson, uses a photoconductive material comprising a base coated with a substance which is insulating in the dark, and having an electric resistance which changes according to the amount of exposure received during imagewise exposure. After this photoconductive material is kept in the dark for a suitable period, the surface is uniformly charged in the dark. Then, this material is imagewise exposed to light using an irradiation pattern having the effect of reducing the surface electric charge in a pattern corresponding to the relative energy contained in various parts of the irradiation pattern. The surface electric charge or electrostatic latent image left on the surface of the photoconductive substance layer (electrophotographic light-sensitive layer) is then contacted with a suitable electroscopic indicating substance, e.g., toner, to form a visible image.

The toner is contained in an insulating liquid or a dried carrier, and in either case it adheres to the surface of the electrophotographic light-sensitive layer according to the electric charge pattern. The adhering indicating substance can be fixed by known means such as by heat, pressure or vapor of a solvent. The electrostatic latent image can be transferred to a second support (for example, paper or films). The electrostatic latent image can be developed on the second support in a similar fashion after being transferred. Electrophotography is one image forming process in which the image is formed as described above.

In such an electrophotographic process, the basic characteristics required for electrophotographic light-sensitive materials are that (1) they can be electrified in the dark so as to have a suitable electric potential, (2) the disappearance of electric charge in the dark is small, and (3) the electric charge can be rapidly reduced by exposure to light.

The above described inorganic substances conventionally used in electrophotographic processes have both faults and advantages. For example, selenium which is widely used at present satisfies the above described requirements (1) to (3), but has the disadvantages that its production requires severe conditions and high production cost, it is inflexible and difficult to process into a belt-like form, and it requires careful handling because it is sensitive to heat and mechanical impact. Cadmium sulfide and zinc oxide are used as electrophotographic light-sensitive materials dispersed in a resin which is a binder. However, they cannot be repeatedly used in such a state, because of mechanical deficiencies in smoothness, hardness, tensile strength and friction resistance.

In recent years, to improve these faults of inorganic substances, electrophotographic light-sensitive materials using various organic substances have been proposed and some of them have been put in practical use. Examples include electrophotographic light-sensitive materials containing poly-N-vinylcarbazole and 2,4,7-trinitrofluoren-9-one. (U.S. Pat. No. 3,484,237), or poly-N-vinylcarbazole sensitized with pyrylium salt type dyes [Japanese Patent Publication No. 25658/73 (U.S. Pat. No. 3,617,268)], electrophotographic light-sensitive materials containing an organic pigment as a main component [Japanese Patent Application (OPI) No. 37543/72 (U.S. Pat. No. 3,898,084)] and electrophotographic light-sensitive materials containing an eutectic crystal complex composed of a dye and a resin as a main component [Japanese Patent Application (OPI) NO. 10785/72 (U.S. Pat. Nos. 3,732,180 and 3,684,502)] (the term "OPI" as used herein refers to a "published unexamined Japanese patent application").

In these organic electrophotographic light-sensitive materials, although the disadvantageous mechanical characteristics and flexibility described in inorganic electrophotographic light-sensitive materials are improved to some degree, their light sensitivity is low and they are not suitable for repeated use, and are consequently insufficient for practical use in electrophotographic light-sensitive materials.

SUMMARY OF THE INVENTION

An object of the present invention is to provide an electrophotographic light-sensitive material having high sensitivity and high durability (repeated used). Another object of the present invention is to provide an electrophotographic light-sensitive material having a small reduction of light sensitivity even upon repeated use. A further object of the present invention is to provide a photoconductive composition which can be applied to various photoconductive materials.

These and other objects of the present invention have now been attained by a photoconductive composition containing a novel trisazo compound (often referred to herein as a "trisazo pigment") represented by the following general formula (1) and to an electrophotographic light-sensitive material having an electrophotographic light-sensitive layer containing the above described trisazo compound.

The present invention thus relates to a photoconductive composition containing at least one trisazo compound represented by the following general formula (1):

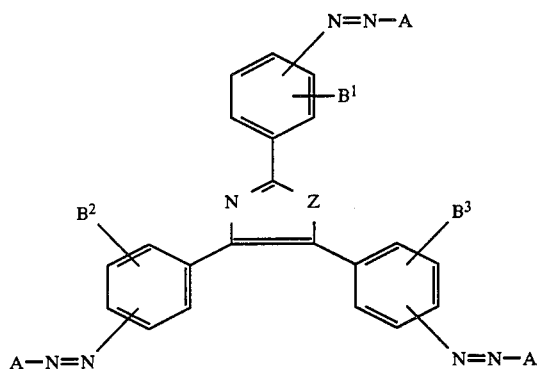

In general formula (1), Z represents

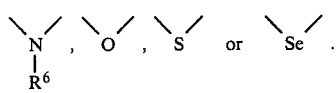

$R^6$ represents a hydrogen atom, a lower alkyl group, an aryl group, an aryloxy group, an alkoxycarbonyl group, an aryloxycarbonyl group, an acyl group, or a substituted group of them.

As', which may be the same or different, each represents

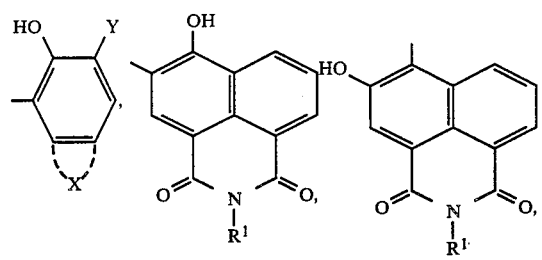

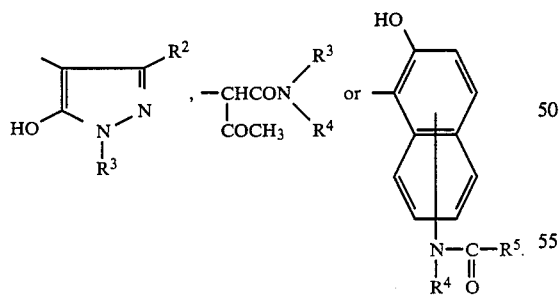

$B^1$, $B^2$ and $B^3$ each represents a hydrogen atom, a halogen atom, a lower alkyl group, a lower alkoxy group, or a substituted lower alkyl group or lower alkoxy group, and $B^1$, $B^2$ and $B^3$ may be identical or different.

X represents an atomic group necessary to form an aromatic ring or heterocyclic ring (which may be substituted or unsubstituted) by condensing with the benzene ring in the above described formula to which the hydroxyl group and Y are bonded.

Y represents

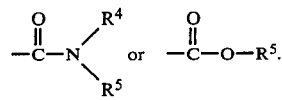

$R^1$ represents an alkyl group, a phenyl group or a substituted alkyl or phenyl group.

$R^2$ represents a hydrogen atom, a lower alkyl group, a carbamoyl group, a carboxyl group, an alkoxycarbonyl group, an aryloxycarbonyl group or a substituted or unsubstituted amino group.

$R^3$ represents an alkyl group, an aromatic group or a heteroaromatic group, each of which may be further substituted.

$R^4$ and $R^5$, which may be the same or different, each represents a hydrogen atom, an alkyl group, an aromatic group, a heteroaromatic group or a substituted alkyl group, aromatic group or heteroaromatic group, provided that $R^4$ and $R^5$ are not both hydrogen atoms, and $R^5$ is not a hydrogen atom when Y is

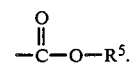

The present invention also relates to an electrophotographic light-sensitive material comprising an electrically conductive base and a layer containing an electric charge carrier transfer compound and an electric charge carrier generating compound, or a layer containing an electric charge carrier transfer compound and a layer containing an electric charge carrier generating compound, wherein a trisazo compound represented by the above described general formula (1) is contained as the electric charge carrier generating compound.

BRIEF DESCRIPTION OF THE DRAWING

The FIGURE shows IR absorption spectrum (by KBr tablet) of a trisazo compound of the present invention represented by general formula (5), in which $A_1$ is No. ($A_1$-1).

DETAILED DESCRIPTION OF THE INVENTION

In trisazo compounds represented by general formula (1),

Z includes

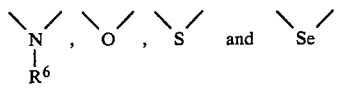

and $R^6$ represents a hydrogen atom, an alkyl group having 1 to 6 carbon atoms, an aryl or aryloxy group having 6 to 20 carbon atoms, an alkoxycarbonyl group in which the alkoxy moiety thereof has 1 to 6 carbon atoms, an aryloxycarbonyl group in which the aryloxy moiety thereof has 6 to 20 carbon atoms, or an acyl group having 1 to 20 carbon atoms.

When $R^6$ represents an unsubstituted alkyl group, examples include a methyl group, an ethyl group, a propyl group, a butyl group, a pentyl group, a hexyl group, an isopropyl group, an isobutyl group, an isohexyl group, a neopentyl group and a tert-butyl group.

When $R^6$ represents a substituted alkyl group, the substituents include a hydroxyl group, an alkoxy group having 1 to 6 carbon atoms, a cyano group, an alkylamino group having 1 to 6 carbon atoms, a dialkylamino group with each alkyl group having 1 to 6 carbon atoms, a halogen atom and an aryl group having 6 to 15 carbon atoms. Examples include a hydroxyalkyl group (for example, a hydroxymethyl group, a 2-hydroxyethyl group, a 3-hydroxypropyl group and a 2-hyroxypropyl group), an alkoxyalkyl group (for example, a methoxymethyl group, a 2-methoxyethyl group, a 3-methoxypropyl group, an ethoxymethyl group and a 2-ethoxyethyl group), a cyanoalkyl group (for example, a cyanomethyl group and a 2-cyanoethyl group), an (alkylamino)alkyl group [for example, a (methylamino)methyl group, a 2-(methylamino)ethyl group and an (ethylamino)methyl group], a (dialkylamino)alkyl group [for example, a (dimethylamino)methyl group and a 2-(dimethylamino)ethyl group], a halogenoalkyl group (for example, a fluoromethyl group, a chloromethyl group and a bromomethyl group), and an aralkyl group (for example, a benzyl group and a phenethyl group).

When $R^6$ represents an unsubstituted aryl group, an unsubstituted alkoxycarbonyl group, or an unsubstituted aryloxycarbonyl group, examples include a phenyl group, a naphthyl group, a phenoxy group, a naphthoxy group, a methoxycarbonyl group, an ethoxycarbonyl group, a phenoxycarbonyl group, and a naphthoxycarbonyl group.

When $R^6$ represents an unsubstituted acyl group, examples include an acetyl group, a propionyl group, a benzoyl group, a naphthoyl group, and a nicotinoyl group.

When $R^6$ represents a substituted aryl group, a substituted aryloxy group, a substituted aryloxycarbonyl group, or a substituted acyl group, the substituents include those described above as substituents of the substituted alkyl group in $R^6$. The number of substituents in either case is 1 to 3, and if there is more than one substitutent, the substituents may be the same or different, may be present in any combination, and may be bonded to any position.

X represents a group capable of forming an aromatic ring, including, for example, a naphthalene ring or an anthracene ring, or a heterocyclic ring such as an indole ring, a carbazole ring, a benzocarbazole ring or a dibenzofuran ring, by condensing with the benzene ring to which the hydroxyl group and Y are bonded.

When X represents an aromatic ring or heterocyclic ring having substituents, substituents include a halogen atom (for example, a fluorine atom, a chlorine atom and a bromine atom), and a lower alkyl group, preferably having 1 to 8 carbon atoms (for example, a methyl group, an ethyl group, a propyl group, a butyl group, an isopropyl group and an isobutyl group). The number of substituents is 1 or 2, and when two substituents are present, they may be the same or different.

$R^1$ can include an alkyl group, preferably, an alkyl group having 1 to 12 carbon atoms, or a phenyl group.

When $R^1$ represents an unsubstituted alkyl group, examples include a methyl group, an ethyl group, a propyl group, a butyl group, a pentyl group, a hexyl group, an isopropyl group, an isobutyl group, an isoamyl group, an isohexyl group, a neopentyl group and a tert-butyl group.

When $R^1$ represents a substituted alkyl group, substituents include a hydroxyl group, an alkoxy group having 1 to 12 carbon atoms, a cyano group, an amino group, an alkylamino group having 1 to 12 carbon atoms, a dialkylamino group with each of two alkyl groups having 1 to 12 carbon atoms, a halogen atom and an aryl group having 6 to 15 carbon atoms. Examples include a hydroxyalkyl group (for example, a hydroxymethyl group, a 2-hydroxyethyl group, a 3-hydroxypropyl group and a 2-hydroxypropyl group), an alkoxyalkyl group (for example, a methoxymethyl group, a 2-methoxyethyl group, a 3-methoxypropyl group, an ethoxymethyl group and a 2-ethoxyethyl group), a cyanoalkyl group (for example, a cyanomethyl group and a 2-cyanoethyl group), an aminoalkyl group (for example, an aminomethyl group, a 2-aminoethyl group and a 3-aminopropyl group), an (alkylamino)alkyl group [for example, a (methylamino)methyl group, a 2-(methylamino)ethyl group and an (ethylamino)methyl group], a (dialkylamino)alkyl group [for example, a (dimethylamino)methyl group and a 2-(dimethylamino)ethyl group], a halogenoalkyl group (for example, a fluoromethyl group, a chloromethyl group and a bromomethyl group), and an aralkyl group (for example, a benzyl group and a phenethyl group).

When $R^1$ represents a substituted phenyl group, substituents include a hydroxyl group, an alkoxy group having 1 to 12 carbon atoms, a cyano group, an amino group, an alkylamino group having 1 to 12 carbon atoms, a dialkylamino group with each of two alkyl groups having 1 to 12 carbon atoms, a halogen atom, an alkyl group having 1 to 6 carbon atoms and a nitro group. Examples include a hydroxyphenyl group, an alkoxyphenyl group (for example, a methoxyphenyl group and an ethoxyphenyl group), a cyanophenyl group, an aminophenyl group, an (alkylamino)phenyl group [for example, a (methylamino)phenyl group and an (ethylamino)phenyl group], a (dialkylamino)phenyl group [for example, a (dimethylamino)phenyl group], a halogenophenyl group (for example, a fluorophenyl group, a chlorophenyl group and a bromophenyl group), an alkylphenyl group (for example, a tolyl group, an ethylphenyl group, a cumenyl group, a xylyl group and a mesityl group) and a nitrophenyl group, and the substituted phenyl group represented by $R^1$ may have 1, 2, or 3 of the above substituents, which may be the same or different. The position of the substituent, or the positions of plural substituents is not limited.

As $R^2$, a hydrogen atom, a lower alkyl group having 1 to 6 carbon atoms, a carbamoyl group, a carboxyl group, an alkoxycarbonyl group in which the alkoxy group has 1 to 12 carbon atoms, an aryloxycarbonyl group in which the aryloxy group has 6 to 20 carbon atoms, or a substituted or unsubstituted amino group is preferred.

When $R^2$ represents a substituted amino group, examples include a methylamino group, an ethylamino group, a propylamino group, a phenylamino group, a tolylamino group, a benzylamino group, a phenethylamino group, a dimethylamino group, a diethylamino group and a diphenylamino group.

When $R^2$ represents a lower alkyl group, examples include a methyl group, an ethyl group, a propyl group, a butyl group, an isopropyl group and an isobutyl group.

When $R^2$ represents an alkoxycarbonyl group, examples include a methoxycarbonyl group, an ethoxycarbonyl group, a propoxycarbonyl group, a butoxycarbonyl group, an isopropoxycarbonyl group and a benzyloxycarbonyl group.

When R² represents an aryloxycarbonyl group, examples include a phenoxycarbonyl group and a toluoxycarbonyl group.

As R³ and R⁵, an alkyl group having 1 to 20 carbon atoms, an aromatic group such as a phenyl group or a naphthyl group, a heteroaromatic group containing an oxygen atom, a nitrogen atom or a sulfur atom, such as a dibenzofuranyl group, a carbazolyl group or a benzocarbazolyl group, any of which may be further substituted, are preferred.

When R³ or R⁵ represents a substituted or unsubstituted alkyl group, examples include the substituted or unsubstituted alkyl groups described for R¹.

When R³ or R⁵ represents a substituted aromatic group such as a substituted phenyl group or a substituted naphthyl group, or a substituted heteroaromatic group containing hetero atoms, such as a substituted dibenzofuranyl group or a substituted carbazolyl group, examples of substituents include a hydroxyl group, a cyano group, a nitro group, a halogen atom (for example, a fluorine atom, a chlorine atom and a bromine atom), an alkyl group having 1 to 12 carbon atoms (for example, a methyl group, an ethyl group, a propyl group and an isopropyl group), an alkoxy group having 1 to 12 carbon atoms (for example, a methoxy group, an ethoxy group, a propoxy group, a butoxy group, a pentyloxy group, an isopropoxy group, an isobutoxy group, an isoamyloxy group, a tert-butoxy group and a neopentyloxy group), an amino group, an alkylamino group having 1 to 12 carbon atoms (for example, a methylamino group, an ethylamino group and a propylamino group), a dialkylamino group having 1 to 12 carbon atoms (for example, a dimethylamino group, a diethylamino group and an N-methyl-N-ethylamino group), an arylamino group having 6 to 12 carbon atoms (for example, a phenylamino group and a tolylamino group), a diarylamino group with each of two aryl groups having 6 to 15 carbon atoms (for example, a diphenylamino group), a carboxyl group, an alkali metal carboxylate group (examples of alkali metal (cations) include Na⊕, K⊕ and Li⊕), an alkali metal sulfonate group (examples of alkali metal (cations) include Na⊕, K⊕ and Li⊕), an alkylcarbonyl group (for example, an acetyl group, a propionyl group and a benzylcarbonyl group), an arylcarbonyl group having an aryl group having 6 to 12 carbon atoms (for example, a benzoyl group and a toluoyl group), an alkylthio group having 1 to 12 carbon atoms (for example, a methylthio group and an ethylthio group), and an arylthio group having 1 to 12 carbon atoms (for example, a phenylthio group and a tolylthio group). The number of the substituents for R³ and R⁵ is 1 to 3, and if the number of substituents is greater than 1, the substituents may be the same or different and may be present in any combination. In addition, they may be bonded to any position.

R⁴ can include a hydrogen atom, a substituted or unsubstituted alkyl group having 1 to 20 carbon atoms or a substituted or unsubstituted phenyl group.

When R⁴ represents a substituted or unsubstituted alkyl or phenyl group, examples include the same substituted or unsubstituted alkyl or phenyl groups described above for R³ or R⁵.

B¹, B² and B³ can include a hydrogen atom, a halogen atom (for example, a chlorine atom, a bromine atom and an iodine atom), an alkyl group having 1 to 6 carbon atoms (for example, a methyl group, an ethyl group and an n-propyl group), and an alkoxy group having 1 to 6 carbon atoms (for example, a methoxy group, an ethoxy group and an n-propoxy group).

When B¹, B² and B³ each represents a substituted or unsubstituted alkyl group or an alkoxy group, examples of the alkyl moiety of these groups include those described above as the substituted or unsubstituted alkyl group in R⁶.

Each benzene ring in formula (1) can be substituted by from 1 to 4 or B¹, B² or B³, respectively. The position(s) of the substituent(s) is not limited.

When A represents

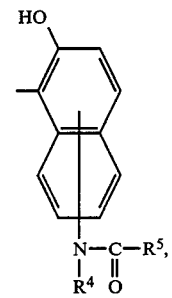

the naphthalene ring may be substituted by

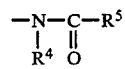

at any of the 3 to 8 positions, but it is preferred that the naphthalene ring is substituted at the 8-position. In the trisazo compound of formula (1), the three azo groups can be respectively substituted by any portion of the three benzene rings.

Of the trisazo compounds represented by the general formula (1) of the present invention, trisazo compounds represented by the following general formulae (2), (3) and (4) and those of formula (4) wherein S is replaced by Se are preferred, because they produce photoconductive compositions having high light sensitivity or produce an electrophotographic layer having high light sensitivity. In addition, the raw materials for production of them are easily available and trisazo compounds can be produced at a low price.

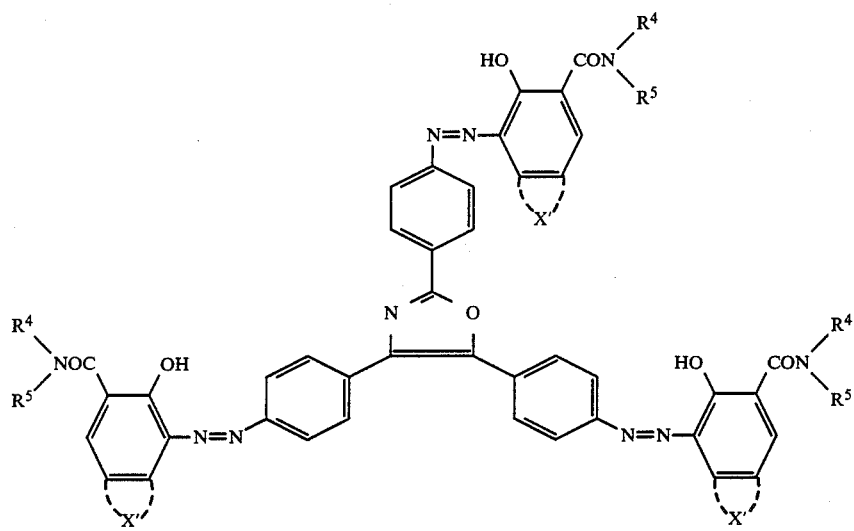

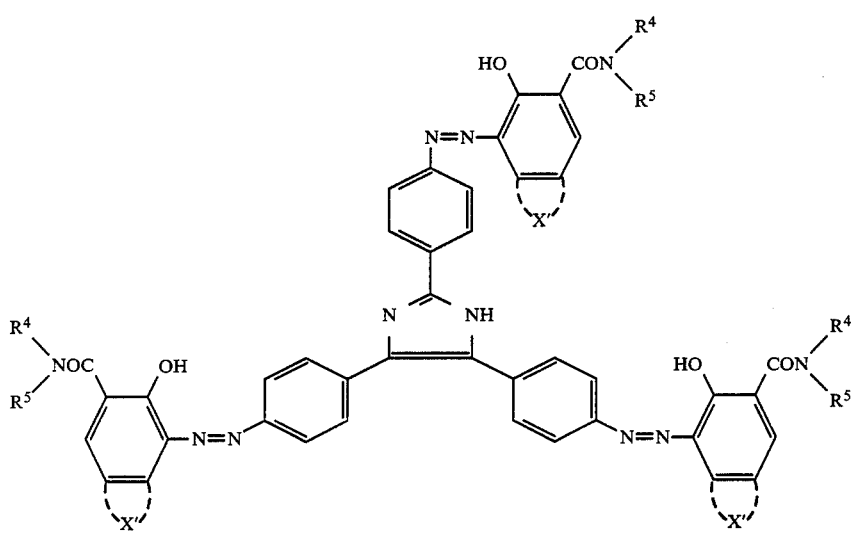

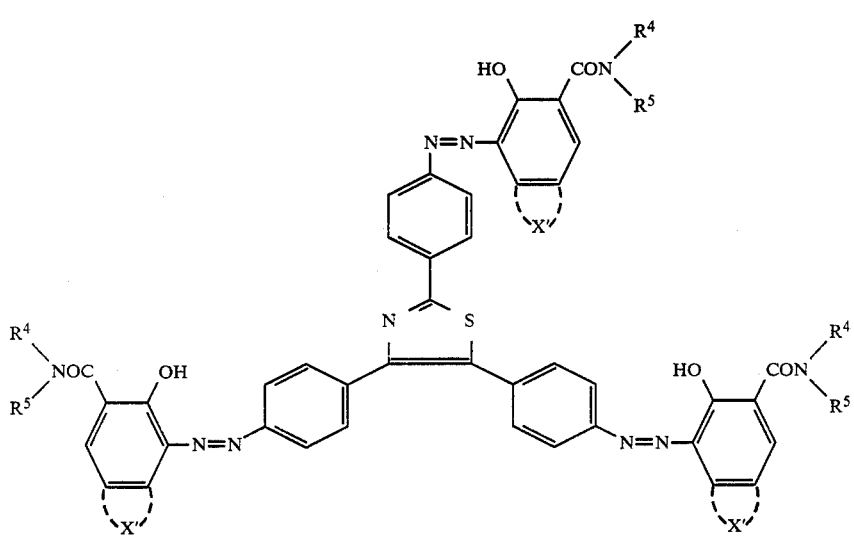

In formulae (2) to (4), X' represents a benzene ring, a naphthalene ring, a carbazole ring or a dibenzofuran ring, and $R^4$ and $R^5$ each has the same meaning as in general formula (1).

The trisazo compounds of the present invention are now illustrated in greater detail by reference to specific examples but the present invention is not to be construed as limited to the following compounds. Examples of the trisazo compounds are represented by the following general formulae (5), (6) and (7), wherein $A_1$ represents a group shown in Table 1.
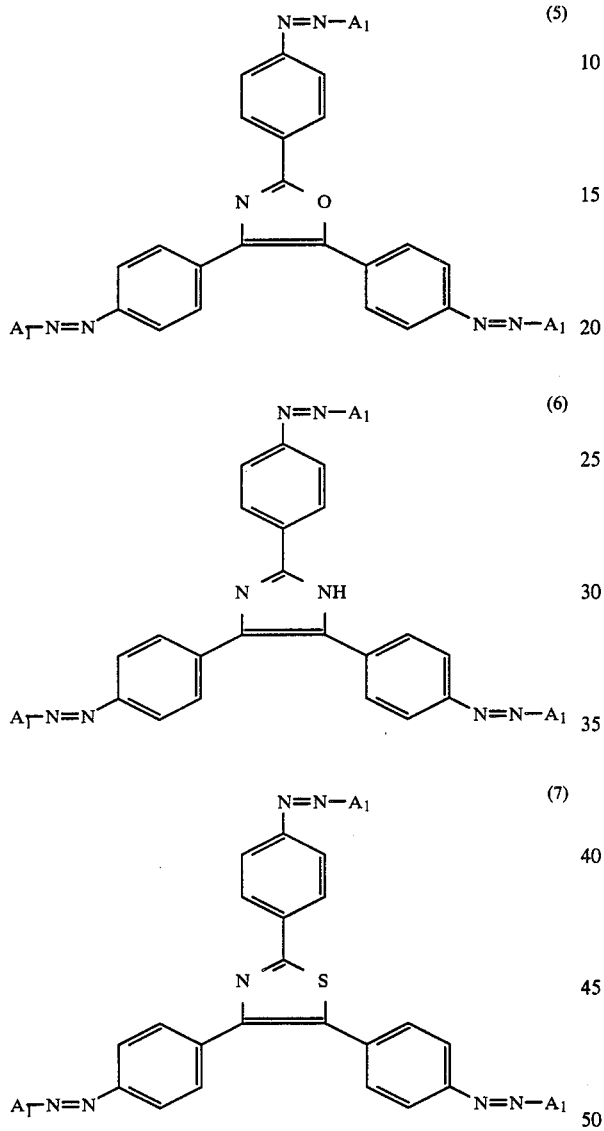

TABLE 1-continued
| No. of A₁ | A₁ |
|---|---|
| (A₁-8) | 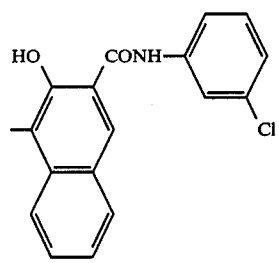 |
| (A₁-9) | 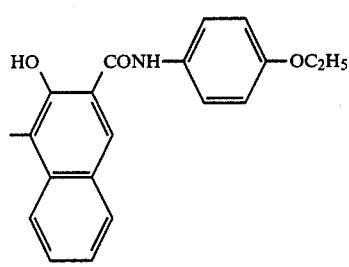 |
| (A₁-10) | 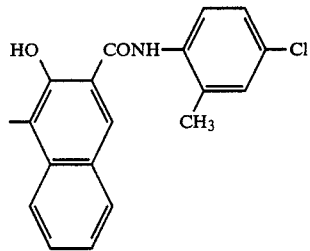 |
| (A₁-11) | 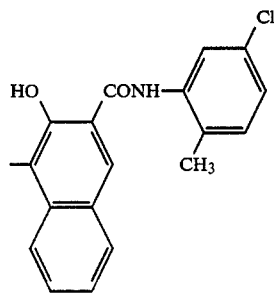 |
| (A₁-12) | 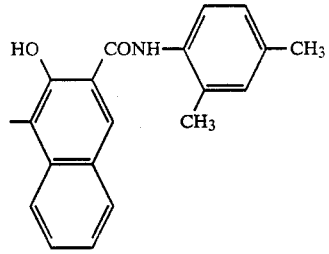 |
| (A₁-13) | 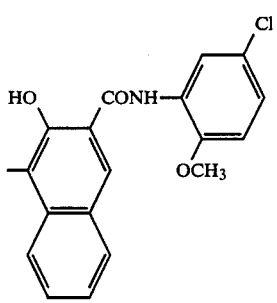 |
| (A₁-14) | 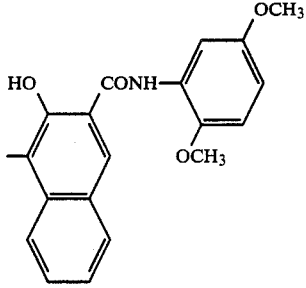 |
| (A₁-15) | 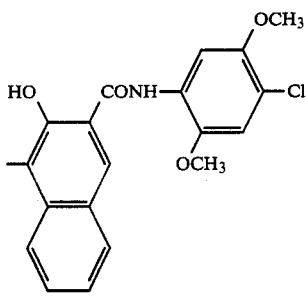 |
| (A₁-16) | 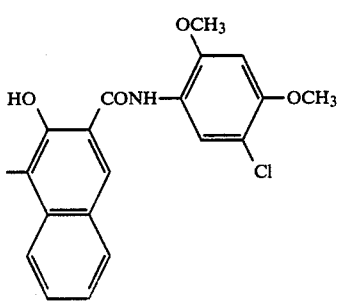 |
| (A₁-17) | 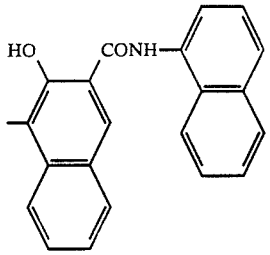 |

TABLE 1-continued
| No. of $A_1$ | $A_1$ |
|---|---|
| ($A_1$-18) | 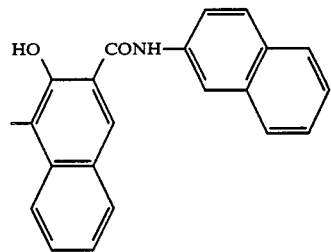 |
| ($A_1$-19) | 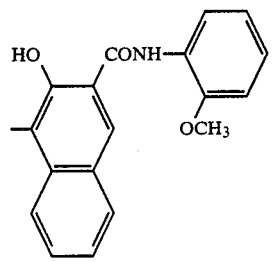 |
| ($A_1$-20) | 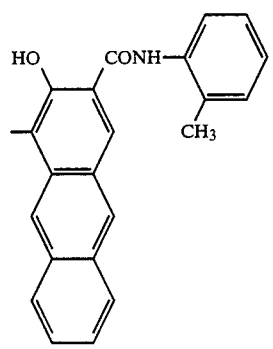 |
| ($A_1$-21) | 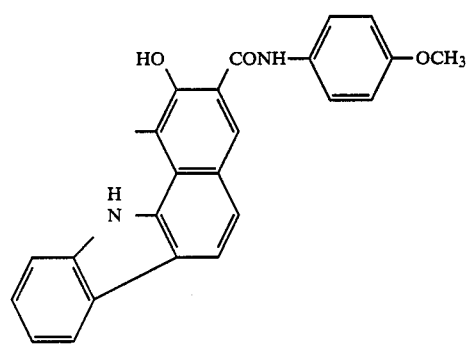 |
| ($A_1$-22) | 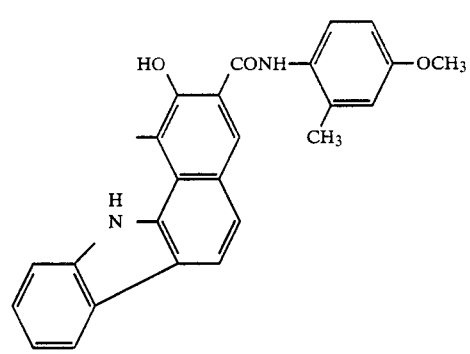 |
| ($A_1$-23) | 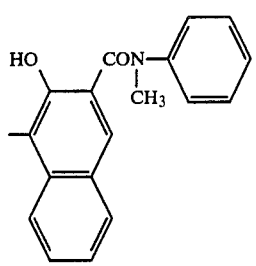 |
| ($A_1$-24) | 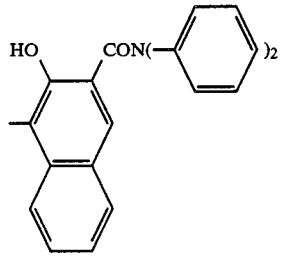 |
| ($A_1$-25) | 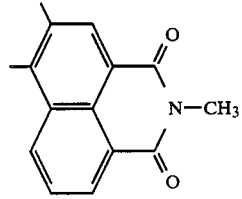 |
| ($A_1$-26) | 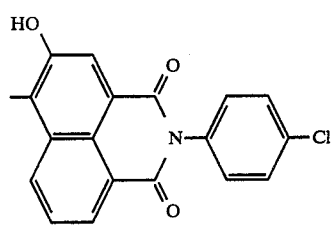 |
| ($A_1$-27) | 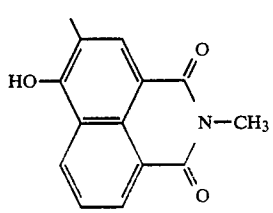 |
| ($A_1$-28) | 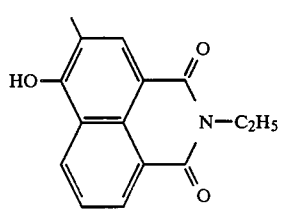 |

TABLE 1-continued

| No. of $A_1$ | $A_1$ |
|---|---|
| ($A_1$-29) | 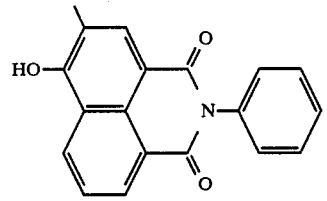 |
| ($A_1$-30) | 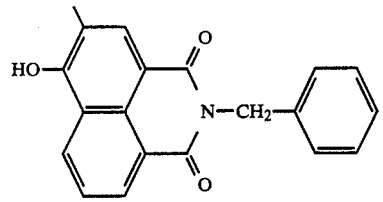 |
| ($A_1$-31) | 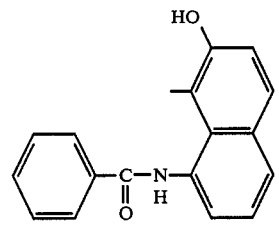 |
| ($A_1$-32) | 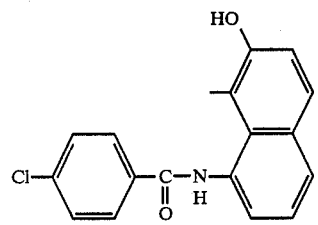 |
| ($A_1$-33) | 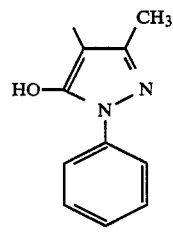 |
| ($A_1$-34) | 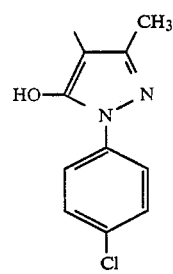 |
| ($A_1$-35) | 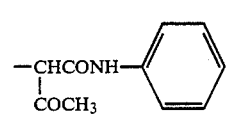 |
| ($A_1$-36) | 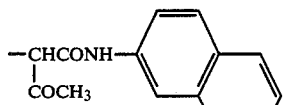 |

The novel trisazo compounds of the present invention can be easily produced according to known processes. For example, trisazo compounds represented by the above described general formulae (5), (6) and (7) can be synthesized by the following process.

A compound represented by general formula (8) wherein $R^7$ is a hydrogen atom is nitrated to produce a compound represented by general formula (8) wherein $R^7$: $NO_2$. It is then reduced under suitable conditions, for example, with an iron powder and dilute hydrochloric acid or stannus chloride and hydrochloric acid, to produce a compound represented by general formula (8) wherein $R^7$: $NH_2$. After it is diazotized and separated as a trisdiazonium salt (in general formula (8), $R^7$: $N_2^{\oplus}Q^{\ominus}$; wherein Q represents an anionic functional group such as $BF_4^{\ominus}$ or $ClO_4^{\ominus}$, etc.), it is coupled with a compound corresponding to the above described trisazo compound (for example, a Naphthol AS type coupler) in a suitable organic solvent, for example, N,N-dimethylformamide, by which the trisazo compound can be easily produced.

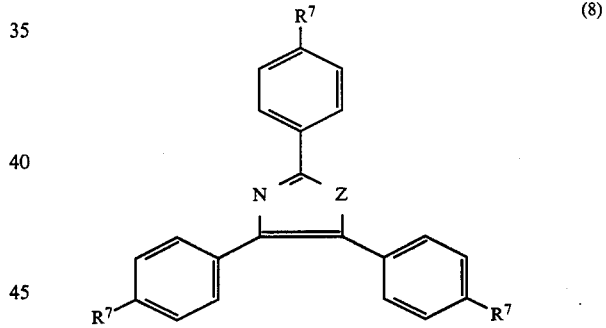

(8)

wherein Z represents O, NH, S or Se.

In addition, the compound represented by general formula (8) wherein $R^7$ is a hydrogen atom can be easily synthesized by a process described in A. O. Fitton and R. K. Samalley, *Practical Heterocyclic Chemistry*, p. 33 (Academic Press, 1968), when Z represents an oxygen atom; by a process described in A. H. Cook and D. G. Jones, *J. Chem. Soc.*, 1941, p. 278, when Z represents a nitrogen atom; a process described in J. Heinze and H. Baumgartel, *Chem. Ber.*, Vol. 103, p. 1572 (1970), when Z represents a sulfur atom; and by a process described in G. Hofmann, *Jus. Liebigs Ann. Chem.*, 250, p. 294 (1889), when Z represents a selenium atom.

SYNTHESIS EXAMPLE 1

Trisazo compound represnented by general formula (5) wherein $A_1$ is No. ($A_1$-1):

20 g of 2,4,5-triphenyloxazole (0.067 mol) was dissolved in 120 ml of concentrated sulfuric acid and cooled with iced water. While keeping the temperature of the solution at 5° C. or less, 40 ml of concentrated nitric acid (S.G.: 1.38) was added dropwise to the solution. After addition, the reacting mixture was allowed to stand at room temperature overnight, and it was poured into 2 l of iced water. The yellow precipitate formed was filtered off and washed with 2 l of water. After washed with 1 l of hot ethanol (70° C.), it was recrystallized from pyridine to obtain 18.8 g (yield: 65%) of 2,4,5-tris(4-nitrophenyl)oxazole.

Then, 4.32 g (0.01 mol) of 2,4,5-tris(4-nitrophenyl)oxazole was mixed with 200 ml of N,N-dimethylformamide and 8 g of an iron powder (reduced iron available from Wako Pure Chemical Industries, Ltd.). To the resulting mixture, 4 ml of concentrated hydrochloric acid and 12 ml of water were added, and the mixture was heated to 100° C. while stirring well. After reacting for 1 hour, the reacting solution was neutralized to pH: 8 with a saturated aqueous solution of sodium carbonate, and while maintained at 100° C., it was filtered in a heated state. The filtrate was poured into 1 l of iced water. The white precipitate formed of 2,4,5-tris(4-aminophenyl)oxazole was filtered off and dried. Yield: 3.27 g (96%).

3.27 g (9.6 mmols) of 2,4,5-tris(4-aminophenyl)oxazole was added to dilute hydrochloric acid prepared with 25 ml of concentrated hydrochloric acid and 30 ml of water, and the mixture was stirred well on a water bath at 60° C. for about 30 minutes. This mixture was then cooled to 0° C. To the mixture, a solution prepared by dissolving 2.57 g of sodium nitrite in 10 ml of water was added dropwise at 0° C. over about 20 minutes. Thereafter, the mixture was stirred at 0° C. for 1 hour. After a small amount of unreacted materials was filtered out, 20 ml of 42% borofluoric acid was added to the filtrate and precipitated crystals was filtered off. After the crystals were washed with a small amount of cold water, they were dried to obtain 3.93 g (yield 64%) of red crystals of trisdiazonium fluoroborate.

2 g of the resulting trisdiazonium salt and 2.52 g of 2-hydroxy-3-naphthoic acid anilide (a coupler) were then dissolved in 200 ml of N,N-dimethylformamide. After a solution composed of 3 g of sodium acetate and 20 ml of water was added dropwise to the resulting solution at 0° C. over about 20 minutes, the mixture was stirred at room temperature for about 2 hours. Thereafter, the precipitate formed was filtered out. After it was washed with 200 ml of water, it was washed with 100 ml of acetone and dried to obtain 3.34 g (yield: 89%) of a trisazo compound.

Decomposition temperature of this compound was above 300° C.

Results of an elemental analysis and absorption spectra were as follows.

Elemental Analysis: As $C_{72}H_{48}O_{10}N_{10}$: Calculated value (%): C, 71.28 H, 3.99 N, 11.55; Found value (%): C, 71.45 H, 4.08 N, 11.66.

IR Absorption Spectrum: (KBr tablet):

Absorption spectrum is shown in the FIGURE. Amide 1670 $cm^{-1}$.

Visible Absorption Spectrum:

Absorption maximum wavelength: 565 nm (in dimethylformamide containing 5% ethylenediamine).

SYNTHESIS EXAMPLES 2 TO 14

Trisazo compounds represented by general formula (5) wherein $A_1$ was varied were synthesized in the same manner as in Synthesis Example 1, using other couplers instead of the coupler in Synthesis Example 1. The trisazo compounds obtained are shown in Table 2 wherein $A_1$ is ($A_1$-2), ($A_1$-3), ($A_1$-4), ($A_1$-5), ($A_1$-10), ($A_1$-12), ($A_1$-17), ($A_1$-18), ($A_1$-19), ($A_1$-21), ($A_1$-22) and ($A_1$-28).

Decomposition temperature, values of elemental analysis and values of the IR absorption spectrum and visible absorption spectrum of each trisazo compound are shown in Table 2.

TABLE 2

| Synthesis Example No. | Trisazo Compound No. of $A_1$ in General Formula (5) | Decomposition Temperature | | Elemental Analysis Calculated Value (%) | Elemental Analysis Found Value (%) | IR Absorption Spectrum ($cm^{-1}$) | Visible Absorption Spectrum (nm) |
|---|---|---|---|---|---|---|---|
| 2 | ($A_1$-2) | Above 300° C. | C | 72.21 | 72.45 | 1,680 | 570 |
|   |   |   | H | 4.66 | 4.54 |   |   |
|   |   |   | N | 10.80 | 10.63 |   |   |
| 3 | ($A_1$-3) | Above 300° C. | C | 69.12 | 69.40 | 1,670 | 565 |
|   |   |   | H | 4.18 | 4.44 |   |   |
|   |   |   | N | 10.75 | 10.50 |   |   |
| 4 | ($A_1$-4) | Above 300° C. | C | 65.55 | 65.29 | 1,670 | 565 |
|   |   |   | H | 3.45 | 3.67 |   |   |
|   |   |   | N | 10.64 | 10.61 |   |   |
| 5 | ($A_1$-5) | Above 300° C. | C | 64.14 | 64.22 | 1,675 | 565 |
|   |   |   | H | 3.36 | 3.66 |   |   |
|   |   |   | N | 13.51 | 13.85 |   |   |
| 6 | ($A_1$-10) | Above 300° C. | C | 66.30 | 66.21 | 1,670 | 570 |
|   |   |   | H | 3.78 | 3.99 |   |   |
|   |   |   | N | 10.31 | 10.07 |   |   |
| 7 | ($A_1$-12) | Above 300° C. | C | 72.21 | 72.57 | 1,670 | 566 |
|   |   |   | H | 4.66 | 4.38 |   |   |
|   |   |   | N | 10.80 | 10.90 |   |   |
| 8 | ($A_1$-17) | Above 300° C. | C | 74.00 | 74.22 | 1,675 | 565 |
|   |   |   | H | 3.99 | 4.07 |   |   |
|   |   |   | N | 10.27 | 10.65 |   |   |
| 9 | ($A_1$-18) | Above 300° C. | C | 74.00 | 73.85 | 1,670 | 565 |
|   |   |   | H | 3.99 | 4.12 |   |   |
|   |   |   | N | 10.27 | 10.39 |   |   |
| 10 | ($A_1$-19) | Above 300° C. | C | 69.12 | 69.01 | 1,670 | 575 |
|   |   |   | H | 4.18 | 4.07 |   |   |
|   |   |   | N | 10.75 | 10.88 |   |   |
| 11 | ($A_1$-21) | Above 300° C. | C | 71.42 | 71.29 | 1,675 | 585 |
|   |   |   | H | 4.04 | 4.31 |   |   |
|   |   |   | N | 11.59 | 11.36 |   |   |

TABLE 2-continued

| Synthesis Example No. | Trisazo Compound No. of $A_1$ in General Formula (5) | Decomposition Temperature | | Elemental Analysis Calculated Value (%) | Elemental Analysis Found Value (%) | IR Absorption Spectrum ($cm^{-1}$) | Visible Absorption Spectrum (nm) |
|---|---|---|---|---|---|---|---|
| 12 | ($A_1$-22) | Above 300° C. | C | 71.50 | 71.52 | 1,675 | 590 |
| | | | H | 4.31 | 4.03 | | |
| | | | N | 11.29 | 11.22 | | |
| 13 | ($A_1$-28) | Above 300° C. | C | 65.97 | 65.99 | 1,670 | 555 |
| | | | H | 3.69 | 3.78 | | |
| | | | N | 12.21 | 12.47 | | |

In the table, IR absorption spectrum: $\nu_{c=o}$, $cm^{-1}$ (KBr tablet). Visible absorption spectrum: λmax, nm (in DMF containing 5% ethylenediamine).

Other trisazo compounds can be synthesized according to the above described synthesis examples by changing the coupler and the corresponding trisdiazonium salt.

The electrophotographic light-sensitive material of the present invention has an electrophotographic light-sensitive layer containing one or more of the trisazo compounds represented by the above described general formula (1). Electrophotographic light-sensitive materials having various constructions have been known, and the electrophotographic light-sensitive material of the present invention may be applied to any conventional structure for a light-sensitive material. However, it generally has a structure in which (1) an electrophotographic light-sensitive layer comprising a trisazo compound dispersed in a binder or an electric charge carrier transport medium is provided on an electrically conductive base, as described in, for example, R. Borsenberger et al., *3rd International Conference on Electrophotography SPSE*, Washington, D.C. (1977), p. 31; or (2) an electric charge carrier generating layer comprising a trisazo compound as a main component is provided on an electrically conductive base and an electric charge carrier transport medium layer is provided on the electric charge carrier generating layer, as described in, for example, Japanese Patent Application (OPI) No. 105536/74 (U.S. Pat. No. 3,824,099).

The trisazo compounds of the present invention act as photoconductive substances, and they generate an electric charge carrier with a very high efficiency when they absorb light. Though the generating electric charge carrier can be transported using the trisazo compound as a medium, it is more effective to effect charge carrier transport using an electric charge carrier transport compound as a medium.

In order to produce an electrophotographic light-sensitive material of type (1), fine particles of a trisazo compound are dispersed in a solution of a binder or a solution prepared by dissolving an electric charge carrier transport compound and a binder, and the resulting dispersion is applied to an electrically conductive base and dried. In this case, the electrophotographic light-sensitive layer is preferred to have a thickness of about 3 to 30μ and preferably about 5 to 20μ.

In order to produce an electrophotographic light-sensitive material of type (1), a trisazo compound is applied to an electrically conductive base by vacuum evaporation or by applying a solution prepared by dissolving it in a solvent such as amine, or by applying a dispersion prepared by dispersing fine particles of the trisazo compound in a suitable solvent containing, if necessary, a binder dissolved therein, and drying, and thereafter, a solution containing an electric charge carrier transport compound and a binder is applied to the resulting layer and drying. In this case, the trisazo compound layer which is the electric charge carrier generating layer is preferred to have a thickness of about 0.01 to 4μ and, preferably, about 0.1 to 2μ and the electric charge carrier transport medium layer is preferred to have a thickness of about 3 to 30μ and, preferably, about 5 to 20μ.

The trisazo compounds used for the light-sensitive material of types (1) and (2) are powdered by means of a conventional dispersing apparatus such as a ball mill, a sand mill or a vibration mill, etc., to a particle size of about 5μ or less and, preferaby, about 2μ or less, but about 0.01μ or more.

If the amount of the trisazo compound used in the electrophotographic light-sensitive material of type (1) is too small, sensitivity deteriorates. If it is too large, the electrification properties deteriorate or strength of the electrophotographic light-sensitive layer becomes poor. Accordingly, the amount of the trisazo compound in the electrophotographic light-sensitive layer is preferred to be in a range of about 0.01 to 2 times by weight, preferably, about 0.05 to 1 time by weight, based on the binder. The amount of the electric charge carrier transport compound optionally added is preferred to be in a range of about 0.1 to 2 times by weight, preferably, about 0.3 to 1.3 times by weight, based on the binder. When an electric charge carrier transfer compound capable of acting as a binder is used, the amount of the trisazo compound added is preferred to be in a range of about 0.01 to 0.5 time by weight based on the binder.

In an embodiment of the present invention having an electric charge carrier generating layer containing a trisazo compound in the electrophotographic light-sensitive material of type (2), the amount of the trisazo compound used is preferred to be about 0.1 to 20 times by weight, preferably about 0.2 to 5 times by weight, the amount of the binder resin. If the amount used is less than the above described range, sufficient sensitivity is not obtained. The amount of the electric charge carrier transport compound in the electric charge carrier transport medium is preferred in a range of about 0.2 to 2 times by weight, preferably about 0.3 to 1.3 times by weight, based on the weight of the binder. When using a high polymer electric charge carrier transport compound capable of functioning as a binder, an additional binder is not required.

In producing the electrophotographic light-sensitive material of the present invention, conventional additives such as plasticizer or a sensitizer may be used together with the binder.

The electrically conductive base used for the electrophotographic light-sensitive material of the present invention can include any conventional base known in the art, including plates of metal such as aluminum, copper or zinc, plastic sheets or plastic films such as those of polyester, to which an electrically conductive material such as aluminum, indium oxide or $SnO_2$ is applied by vacuum evaporation or by application of a dispersion, and paper which is processed so as to have an electrically conductive property.

As binders, electrically insulating film-forming high polymers which are hydrophilic and have a high dielectric constant are suitably used, including the following examples which are not to be construed as limiting the scope of the invention: polycarbonate, polyester, methacrylic resin, acrylic resin, polyvinyl chloride, polyvinylidene chloride, polystyrene, polyvinyl acetate, styrenebutadiene copolymer, vinylidene chloride-acrylonitrile copolymer, vinyl chloride-vinyl acetate copolymer, vinyl chloride-vinyl acetate-maleic anhydride terpolymer, silicone resin, silicone-alkyd resin, phenol-formaldehyde resin, styrene-alkyd resin, poly-N-vinylcarbazole and polyester carbonate.

These binders can be used alone or as a mixture of two or more thereof.

Suitable plasticizers which can be used include biphenyl, chlorinated biphenyl, o-terphenyl, p-terphenyl, dibutyl phthalate, dimethylglycol phthalate, dioctyl phthalate, triphenyl phosphate, methylnaphthalene, benzophenone, chlorinated paraffin, polypropylene, polystyrene, dilaurylthiodipropionate, 3,5-dinitrosalicylic acid, and various fluorohydrocarbons.

In addition, in order to improve the surface properties of the electrophotographic light-sensitive material, silicone oil may be added.

Useful sensitizing agents include chloranil, tetracyanomethylene, Methyl Violet, Rhodamine B, cyanine dyes, merocyanine dyes, pyrylium dyes and thiapyrylium dyes.

Electric charge carrier transport compounds are generally classified either as compounds which transport an electron or as compounds which transport a hole. Both can be used for the electrophotographic light-sensitive material of the present invention. Compounds which transport an electron include compounds having an electron attractive group, for example, 2,4,7-trinitro-9-fluorenone, 2,4,5,7-tetranitro-9-fluorenone, 9l-dicyanomethylene-2,4,7-trinitrofluorenone, 9-dicyanomethylene-2,4,5,7-tetranitrofluorenone, tetranitrocarbazole chloranil, 2,3-dichloro-5,6-dicyanobenzoquinone, 2,4,7-trinitro-9,10-phenanthrenequinone, tetrachlorophthalic anhydride, tetracyanoethylene and tetracyanoquinodimethane.

Compounds which transport a hole include compounds having an electron donative group, for example, high polymers such as (1) Polyvinyl carbazole and derivatives thereof described in Japanese Patent Publication No. 10966/59, (2) Vinyl polymers such as polyvinyl pyrene, polyvinyl anthracene, poly-2-vinyl-4-(4'-dimethylaminophenyl)-5-phenyloxazole or poly-3-vinyl-N-ethylcarbazole, described in Japanese Patent Publication Nos. 18674/68 (U.S. Pat. No. 3,232,755) and 19192/68 (U.S. Pat. No. 3,162,532), (3) Polymers such as polyacenaphthylene, polyindene or acenaphthylene-styrene copolymer described in Japanese Patent Publication No. 19193/68 (U.S. Pat. No. 3,169,060), (4) Condensation resins such as pyrene-formaldehyde resin, bromopyrene-formaldehyde resin or ethylcarbazole-formaldehyde resin described in Japanese Patent Publication No. 13904/81 (U.S. Pat. Nos. 3,842,038 and 3,881,922), or (5) Various triphenylmethane polymers described in Japanese Patent Application (OPI) Nos. 90883/81 and 161550/81, and low molecular weight compounds such as (6) Triazole derivatives described in U.S. Pat. No. 3,112,197, (7) Oxadiazole derivatives described in U.S. Pat. No. 3,189,447, (8) Imidazole derivatives described in Japanese Patent Publication No. 16096/62, (9) Polyarylalkane derivatives described in U.S. Pat. Nos. 3,615,402, 3,820,989 and 3,542,544, Japanese Patent Publication Nos. 555/70 (U.S. Pat. No. 3,542,547) and 10983/76 (U.S. Pat. No. 3,963,799), and Japanese Patent Application (OPI) Nos. 93224/76 (U.S. Pat. No. 4,127,412), 108667/80, 156953/90 and 36656/81,

(10) Pyrazoline derivatives and pyrazolone derivatives described in U.S. Pat. Nos. 3,180,729 and 4,278,746 and Japanese Patent Application (OPI) Nos. 88064/80, 88065/80, 10537/74 (U.S. Pat. No. 3,837,851), 51086/80, 80051/81, 88141/81, 45545/82, 112637/79 and 74546/80,

(11) Phenylenediamine derivatives described in U.S. Pat. No. 3,615,404, Japanese Patent Publication No. 10105/76, Japanese Patent Application (OPI) Nos. 83435/79, 110836/79 and 119925/79, and Japanese Patent Publication Nos. 3712/71 and 28336/72,

(12) Arylamine derivatives described in U.S. Pat. No. 3,567,450, Japanese Patent Publication No. 35702/74, West German Patent (DAS) No. 1,110,518, U.S. Pat. Nos. 3,180,703, 3,240,597, 3,658,520, 4,232,103, 4,175,961 and 4,012,376, Japanese Patent Application (OPI) Nos. 144250/80 and 119132/81, Japanese Patent Publication No. 27577/64, and Japanese Patent Application (OPI) No. 22437/81.

(13) Amino substituted chalcone derivatives described in U.S. Pat. No. 3,526,501,

(14) N,N-bicarbazyl derivatives described in U.S. Pat. No. 3,542,546,

(15) Oxazole derivatives described in U.S. Pat. No. 3,257,203,

(16) Styrylanthracene derivatives described in Japanese Patent Application (OPI) No. 46234/81,

(17) Fluorenone derivatives described in Japanese Patent Application (OPI) No. 110837/79, or

(18) Hydrazone derivatives described in U.S. Pat. No. 3,717,462, Japanese Patent Application (OPI) Nos. 59143/79 (corresponding to U.S. Pat. No. 4,150,987), 52063/80 (U.S. Pat. No. 4,338,388), 52064/80, 46760/80, 85495/80, 11350/82, 148749/82 and 104144/82.

In the present invention, the electric charge carrier transport compounds are not limited to compounds described in (1) to (18), and any known electric charge carrier transfer compounds can be used.

These electric charge transfer substances can be used alone or in an optional combination of two or more of them.

In the light-sensitive material obtained as described above, an adhesive layer or a barrier layer can be provided, if necessary, between the electrically conductive base and the light-sensitive layer. Materials used for these layers include gelatin, casein, polyvinyl alcohol, ethyl cellulose, carboxymethyl cellulose, the vinylidene chloride type polymer latex described in Japanese Patent Application (OPI) No. 84247/82, the styrenebutadiene polymer latex described in Japanese Patent Application (OPI) No. 114544/82, and aluminum oxide, as well as the above described high polymers used as the binders. These layers are preferred to have a thickness of about 1 μm or less.

The electrophotographic light-sensitive materials of the present invention generally have high sensitivity and excellent durability.

The electrophotographic light-sensitive material of the present invention can be applied to not only electrophotographic copying machines but also in the field of light-sensitive materials for printers using a laser or Braun tube as a light source, and the like.

The photoconductive composition containing the trisazo compound of the present invention can be used as a photoconductive layer in a video camera tube or as a photoconductive layer in solid camera elements having a light receiving layer (photoconductive layer) which is provided on the entire face of a one-dimensionally or two-dimensionally arranged semiconductor circuit for carrying out signal transfer or scanning. Further, it can be used as a photoconductive layer in solar cells as described in A. K. Ghosh, Tom Feng, *J. Appl. Phys.*, 49 (12), p. 5982 (1978).

The trisazo compounds of the present invention can be used as photoconductive coloring particles in a light-electrophoresis system or as coloring particles in a dry type or wet type electrophotographic developer.

When the trisazo compound of the present invention is dispersed in a solution of an alkali soluble resin such as a phenol resin together with the above described electric charge carrier transport compounds such as oxadiazole derivatives or hydrazone derivatives, and the dispersion is applied to an electrically conductive base such as aluminum and dried, a printing plate having high resolving power, high durability and high sensitivity can be obtained by carrying out imagewise exposure, toner development and etching with an aqueous solution of alkali, as described in Japanese Patent Publication No. 17162/62 and Japanese Patent Application (OPI) Nos. 19063/80, 161250/80 and 147656/82. Printed circuits can be produced in the same manner.

The present invention is illustrated in greater detail by reference to the following examples, but the present invention is not restricted to the examples. In the examples, unless otherwise indicated all parts, percents and ratios are by weight.

EXAMPLE 1

1 part of a trisazo compound represented by general formula (5) wherein $A_1$ was No. ($A_1$-1) which was synthesized in Synthesis Example 1, 5 parts of 4,4'-bis(diethylamino)-2,2'-dimethyltriphenylmethane and 5 parts of polycarbonate of bisphenol A [Panlite K-1300 (molecular weight: about 30,000), made by Teijin Limited] were added to 95 parts of dichloromethane. The mixture was mixed in a ball mill to prepare a coating solution having an average particle size of 0.4 μm. It was applied to an electrically conductive transparent base (produced by providing a vacuum evaporation film of indium oxide on the surface of a 100 μm polyethylene terephthalate film of surface resistance: $10^3 \Omega$) by a wire round rod, and dried to prepare an electrophotographic light-sensitive material having a monolayer type electrophotographic light-sensitive layer having a thickness of about 8 μm.

This electrophotographic light-sensitive material was electrified to +400 V by a corona discharge of +5 KV using a testing apparatus for electrostatic copying paper (type SP-428, produced by Kawaguchi Denki Co.), and it was then exposed to light with a tungsten lamp of a color temperature of 2,854° K. to produce an exposure of 4 luxes at the surface. The time necessary to reduce the surface electric potential to half of the initial surface electric potential was measured, and the half decay exposure amount $E_{50}$ (lux.sec) was determined to be 6.8 lux.sec.

EXAMPLES 2 TO 10

Electrophotographic light-sensitive materials having a monolayer structure were produced in the same manner as in Example 1 except that trisazo compounds shown in Table 3 were used instead of the trisazo compound synthesized in Synthesis Example 1, and the half decay exposure amount $E_{50}$ by positive electrification was determined in the same manner as in Example 1. The results obtained are shown in Table 3.

TABLE 3

| Example No. | Trisazo Compound | $E_{50}$ (lux · sec) |
| --- | --- | --- |
| 2 | $A_1$ in general formula (5) is No. ($A_1$-2) | 2.4 |
| 3 | $A_1$ in general formula (5) is No. ($A_1$-4) | 4.6 |
| 4 | $A_1$ in general formula (5) is No. ($A_1$-10) | 3.1 |
| 5 | $A_1$ in general formula (6) is No. ($A_1$-1) | 4.4 |
| 6 | $A_1$ in general formula (6) is No. ($A_1$-3) | 5.7 |
| 7 | $A_1$ in general formula (6) is No. ($A_1$-5) | 6.1 |
| 8 | $A_1$ in general formula (7) is No. ($A_1$-2) | 3.5 |
| 9 | $A_1$ in general formula (7) is No. ($A_1$-12) | 2.9 |
| 10 | $A_1$ in general formula (7) is No. ($A_1$-17) | 3.3 |

EXAMPLE 11

After 5 parts of a trisazo compound represented by the general formula (5) wherein $A_1$ is No. ($A_1$-1) synthesized in Synthesis Example 1 and 5 parts of polyester resin [trade name: Vylon 200 (molecular weight: about 20,000, Tg: 67° C., softening point: 163° C.), produced by Toyo Spinning Co.] were processed together with 50 parts of tetrahydrofuran by means of a ball mill for 20 hours, the resulting dispersion having an average particle size of 0.4 μm was applied to an electrically conductive base (produced by providing an aluminum vacuum evaporation layer on the surface of a 75 μm polyethylene terephthalate film of surface resistance: $4 \times 10^2 \Omega$) using a wire round rod, and dried to produce an electric charge generating layer having a thickness of 0.5 μm.

Then, to the electric charge generating layer a solution prepared by dissolving 3.6 parts of p-(diphenylamino)benzaldehyde N'-methyl-N'-phenylhydrazone (as described in Japanese Patent Application (OPI) No. 85495/82)

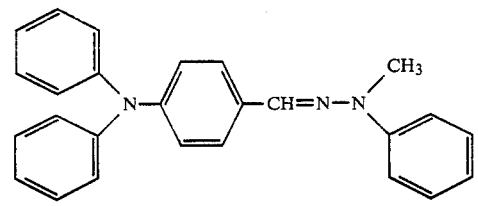

and 4 parts of polycarbonate of bisphenol A (Panlite K-1300) in a mixture of 13.3 parts of dichloromethane and 26.6 parts of 1,2-dichloroethane was applied by a wire round rod, and dried to form an electric charge, transport layer having a thickness of 11 μm. Thus, an electrophotographic light-sensitive material having a two-layer electrophotographic light-sensitive layer was produced.

The initial surface electric potential $V_0$ of the light-sensitive material when it was electrified by corona discharge of $-6$ KV, the exposure amount $E_{50}$ necessary to reduce the surface electric potential to half of the initial surface electric potential $V_0$ when the light-sensitive material was exposed to light using a tungsten lamp providing an intensity of illumination of 30 luxes at the surface, and the surface electric potential (residual electric potential) $V_R$ when the material was exposed to light at an exposure amount of 60 lux.sec were measured.

This measurement was repeated 3,000 times, to obtain the results shown in Table 4.

TABLE 4

|  | The 1st Time | The 3,000th Time |
|---|---|---|
| $V_0$ (V) | −830 | −820 |
| $E_{50}$ (lux · sec) | 4.3 | 4.4 |
| $V_R$ (V) | −5 | −6 |

EXAMPLES 12 TO 49

Electrophotographic light-sensitive materials having a two-layer structure were produced in the same manner as in Example 11, except that trisazo compounds shown in Table 5 were used instead of the trisazo compound synthesized in Synthesis Example 1, and the half decay exposure amount $E_{50}$ was determined in the same manner. The results are shown in Table 5.

TABLE 5

| Example No. | Trisazo Compound | $E_{50}$ (lux · sec) |
|---|---|---|
| 12 | $A_1$ in general formula (5) is No. ($A_1$-2) | 2.0 |
| 13 | $A_1$ in general formula (5) is No. ($A_1$-3) | 2.9 |
| 14 | $A_1$ in general formula (5) is No. ($A_1$-4) | 3.1 |
| 15 | $A_1$ in general formula (5) is No. ($A_1$-5) | 1.8 |
| 16 | $A_1$ in general formula (5) is No. ($A_1$-10) | 2.1 |
| 17 | $A_1$ in general formula (5) is No. ($A_1$-12) | 4.5 |
| 18 | $A_1$ in general formula (5) is No. ($A_1$-17) | 3.4 |
| 19 | $A_1$ in general formula (5) is No. ($A_1$-18) | 2.5 |
| 20 | $A_1$ in general formula (5) is No. ($A_1$-19) | 4.3 |
| 21 | $A_1$ in general formula (5) is No. ($A_1$-21) | 4.1 |
| 22 | $A_1$ in general formula (5) is No. ($A_1$-22) | 4.5 |
| 23 | $A_1$ in general formula (5) is No. ($A_1$-28) | 3.0 |
| 24 | $A_1$ in general formula (5) is No. ($A_1$-31) | 2.9 |
| 25 | $A_1$ in general formula (5) is No. ($A_1$-33) | 10.1 |
| 26 | $A_1$ in general formula (5) is No. ($A_1$-35) | 19.3 |
| 27 | $A_1$ in general formula (6) is No. ($A_1$-1) | 4.6 |
| 28 | $A_1$ in general formula (6) is No. ($A_1$-2) | 3.3 |
| 29 | $A_1$ in general formula (6) is No. ($A_1$-5) | 2.9 |
| 30 | $A_1$ in general formula (6) is No. ($A_1$-8) | 3.8 |
| 31 | $A_1$ in general formula (6) is No. ($A_1$-11) | 6.1 |
| 32 | $A_1$ in general formula (6) is No. ($A_1$-15) | 1.9 |
| 33 | $A_1$ in general formula (6) is No. ($A_1$-21) | 3.1 |
| 34 | $A_1$ in general formula (6) is No. ($A_1$-26) | 2.2 |
| 35 | $A_1$ in general formula (6) is No. ($A_1$-32) | 3.7 |
| 36 | $A_1$ in general formula (6) is No. ($A_1$-33) | 21.0 |
| 37 | $A_1$ in general formula (6) is No. ($A_1$-36) | 33.5 |
| 38 | $A_1$ in general formula (7) is No. ($A_1$-1) | 2.7 |
| 39 | $A_1$ in general formula (7) is No. ($A_1$-2) | 2.9 |
| 40 | $A_1$ in general formula (7) is No. ($A_1$-4) | 1.8 |
| 41 | $A_1$ in general formula (7) is No. ($A_1$-6) | 1.7 |
| 42 | $A_1$ in general formula (7) is No. ($A_1$-10) | 2.4 |
| 43 | $A_1$ in general formula (7) is No. ($A_1$-13) | 3.1 |
| 44 | $A_1$ in general formula (7) is No. ($A_1$-17) | 3.6 |
| 45 | $A_1$ in general formula (7) is No. ($A_1$-22) | 2.3 |
| 46 | $A_1$ in general formula (7) is No. ($A_1$-28) | 3.5 |
| 47 | $A_1$ in general formula (7) is No. ($A_1$-31) | 2.9 |
| 48 | $A_1$ in general formula (7) is No. ($A_1$-33) | 18.2 |
| 49 | $A_1$ in general formula (7) is No. ($A_1$-35) | 25.6 |

EXAMPLE 50

5 parts of a trisazo compound represented by the general formula (5) wherein $A_1$ is No. ($A_1$-1) synthesized in Synthesis Example 1, 40 parts of the hydrazone compound used in Example 11 and 100 parts of benzyl methacrylate-methacrylate acid copolymer ([η] 30° C. methyl ethyl ketone: 0.12, methacrylic acid content: 32.9%, molecular weight: about 100,000) were added to 600 parts of dichloromethane, and the mixture was subjected to ultrasonic dispersion.

The resulting dispersion having an average particle size of 0.5 μm was applied to a sand-dressed aluminum plate having a thickness of 0.25 mm, and dried to produce an electrophotographic light-sensitive printing plate material having an electrophotographic light-sensitive layer having a dry film thickness of 6 μm.

After the resulting sample was electrified in the dark by corona discharge ($+6$ KV) to a surface electric potential of the light-sensitive layer of about $+600$ V, it was exposed to tungsten light of a color temperature of 2,854° K. to an illumination of 2.0 luxes. The half decay exposure amount was determined as in Example 1 and was 4.8 lux.sec.

After this sample was electrified in the dark to a surface electric potential of about $+400$ V, it was imagewise exposed in contact with a positive transparent original for 0.2 second using a halogen lamp. It was dipped for 20 seconds in a liquid developer containing a toner prepared by adding 5 parts of finely divided granular polymethyl methacrylate (toner) (molecular weight: 100,000, particle size: 0.4 μm) and 0.01 part of lecithin of soybean oil in 1,000 parts of Isoper H (petroleum type solvent, Esso Standard Co.) to obtain a sharp positive toner image.

The toner image was fixed by heating to 100° C. for 30 seconds. This printing plate material was immersed for about 1 minute in a solution prepared by dissolving 70 parts of sodium metasilicate hydrate in a mixture of 140 parts of glycerine, 550 parts of ethylene glycol and 150 parts of ethanol. It was then washed with flowing water with gentle brushing to remove the part of the electrophotographic light-sensitive layer to which the toner did not adhere to produce a printing plate.

Alternatively, the electrostatic latent image was developed with a magnetic brush using a toner for Xerox 3500 (produced by Fuji Xerox Co.) instead of the liquid developer and, thereafter, it was fixed by heating to 80° C. for 30 seconds. The part of the light-sensitive layer to which the toner did not adhere was then removed by immersion in a solution of alkali (pH 12) to produce a printing plate.

When printing was carried out by the conventional manner using the resulting printing plate by means of an offset printing machine: Hamadastar 600CD, 50,000 sheets of very clear print having no stain could be obtianed.

EXAMPLES 51 TO 60

Electrophotograhic light-sensitive materials having a two-layer structure were produced in the same manner as in Example 11, except that trisazo compounds shown in Table 6 were used instead of the trisazo compound synthesized in Synthesis Example 1, and the half decay exposure amount $E_{50}$ was determined in the same manner. The results are shown in Table 6.

TABLE 6

| Example No. | Trisazo Compound (in general formula (7), S is replaced by Se, and $A_1$ is as follows) | $E_{50}$ (lux · sec) |
|---|---|---|
| 51 | No. ($A_1$-1) | 2.2 |
| 52 | No. ($A_1$-2) | 3.7 |
| 53 | No. ($A_1$-3) | 2.6 |
| 54 | No. ($A_1$-9) | 4.1 |
| 55 | No. ($A_1$-15) | 6.5 |
| 56 | No. ($A_1$-17) | 1.9 |
| 57 | No. ($A_1$-22) | 2.4 |
| 58 | No. ($A_1$-31) | 3.3 |
| 59 | No. ($A_1$-34) | 19.6 |
| 60 | No. ($A_1$-35) | 27.5 |

COMPARATIVE EXAMPLES 1 AND 2

Electrophotographic light-sensitive materials having a two-layer structure were produced in the same manner as in Example 11, except that disazo compounds represented by the following formulae (1A) (described in Japanese Patent Application (OPI) No. 219263/83) and (2A) (described in Japanese Patent Application (OPI) No. 53554/84) were used instead of the trisazo compound synthesized in Synthesis Example 1, and the initial surface electric potential $V_0$, the half decay exposure amount $E_{50}$, and the residual electric potential $V_R$ were determined in the same manner. Further, this measurement was repeated 3,000 times in the same manner as in Example 11. The results are shown in Table 7.

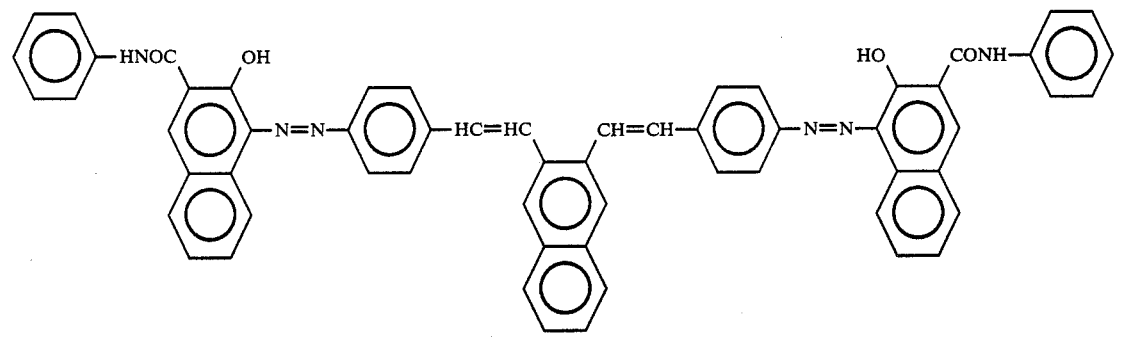

(1A)

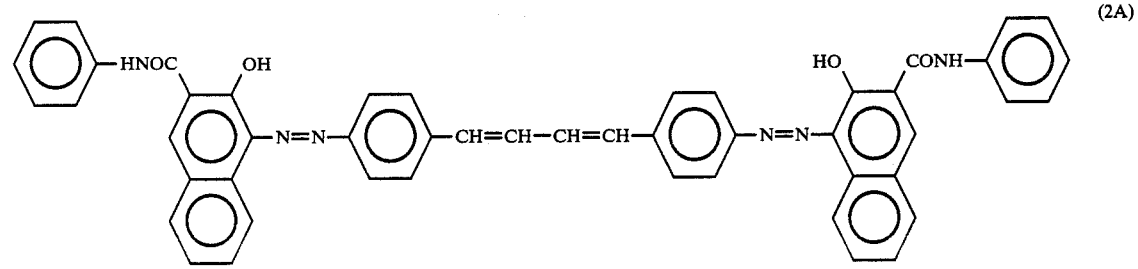

(2A)

TABLE 7

|  | Comparative Example 1 Disazo Compound (1A) | | Comparative Example 2 Disazo Compound (2A) | |
|---|---|---|---|---|
|  | The 1st Time | The 3,000th Time | The 1st Time | The 3,000th Time |
| $V_0$ (V) | 710 | 600 | 660 | 530 |
| $E_{50}$ (lux · sec) | 60.5 | 71.0 | 39.0 | 45.0 |
| $V_R$ (V) | −21 | −34 | −30 | −40 |

As is clear from Table 7, the electrophotographic light-sensitive material of the present invention is markedly superior in sensitivity, residual electric potential, and stability for repeated use to the comparative ones.

While the invention has been described in detail and with reference to specific embodiments thereof, it will be apparent to one skilled in the art that various changes and modifications can be made therein without departing from the spirit and scope thereof.

What is claimed is:

1. A photoconductive composition containing at least one trisazo compound represented by the following general formula (1):

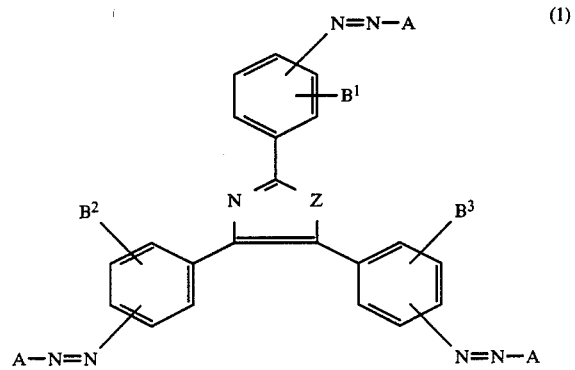

wherein Z represents

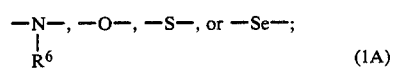

$R^6$ represents a hydrogen atom, a lower alkyl group, an aryl group, an aryloxy group, an alkoxycarbonyl group, an aryloxycarbonyl group, an acyl group, or a substituted group of them; As′, which may be the same or different, each represents

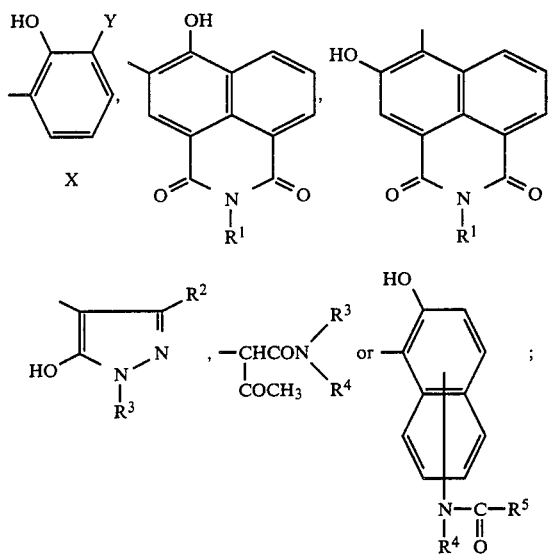

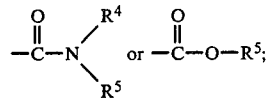

$B^1$, $B^2$ and $B^3$ each represents a hydrogen atom, a halogen atom, a lower alkyl group, a lower alkoxy group or a substituted lower alkyl group or lower alkoxy group, and $B^1$, $B^2$ and $B^3$ may be identical or different; X represents an atomic group necessary to form an aromatic ring or heterocyclic ring, which may be substituted or unsubstituted, by condensing with the benzene ring to which the hydroxyl group and Y are bonded; Y represents $R^1$ represents an alkyl group, a phenyl group or a substituted alkyl or phenyl group; $R^2$ represents a hydrogen atom, a lower alkyl group, a carbamoyl group, a carboxyl group, an alkoxycarbonyl group, an aryloxycarbonyl group or a substituted or unsubstituted amino group; $R^3$ represents an alkyl group, an aromatic group or a heteroaromatic group or a substituted alkyl group, aromatic group or heteroaromatic group; and $R^4$ and $R^5$, which may be the same or diffent, each represents a hydrogen atom, an alkyl group, an aromatic group, a heteroaromatic group or a substituted alkyl group, aromatic group or heteroaromatic group, provided that $R^4$ and $R^5$ are not both hydrogen atoms, and $R^5$ are not a hydrogen atom when Y is

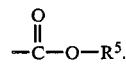

2. An electrophotographic light-sensitive material comprising an electrically conductive base and a layer containing an electric charge carrier transport compound and the trisazo compound claimed in claim 1 as an electric charge carrier generating compound.

3. An electrophotographic light-sensitive material comprising an electrically conductive base, an electric charge carrier transport layer containing an electric charge carrier transport compound, and an electric charge carrier generating layer containing the trisazo compound claimed in claim 1.

4. The photoconductive composition claimed in claim 1, wherein said trisazo compound is represented by the following general formulae (2), (3) or (4):

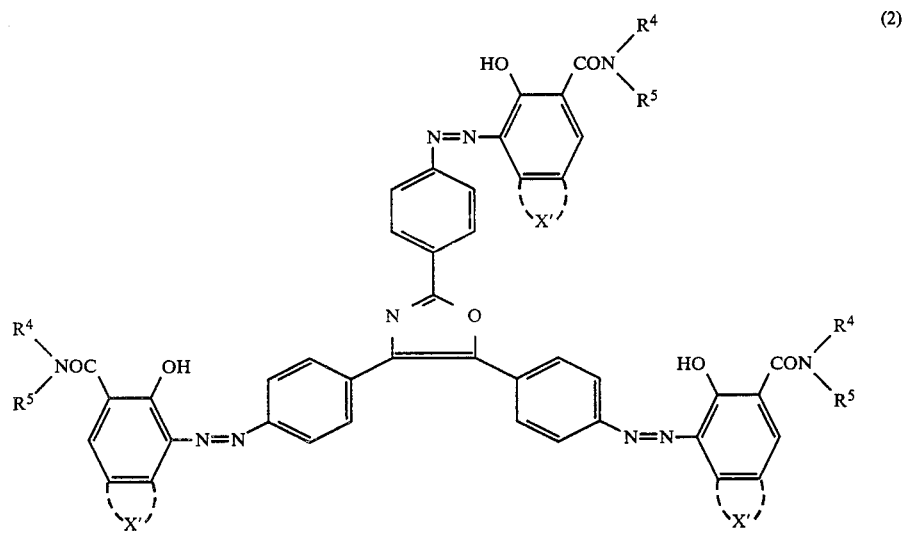

-continued

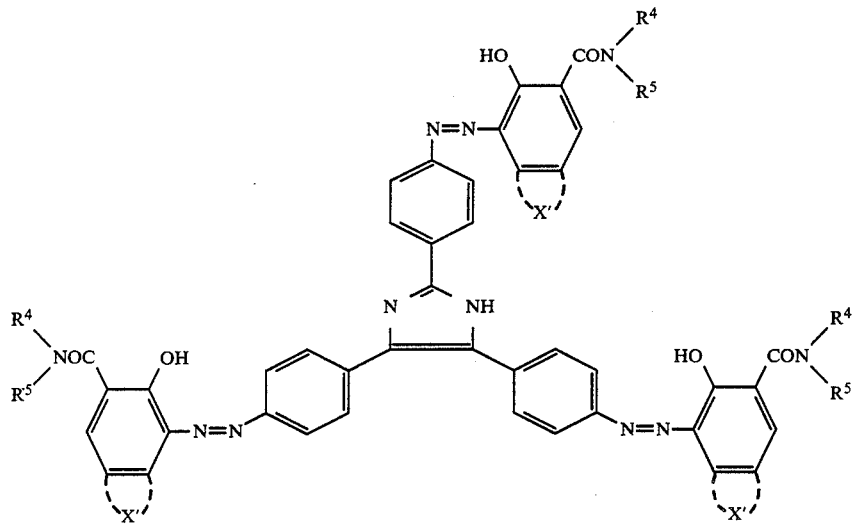

(3)

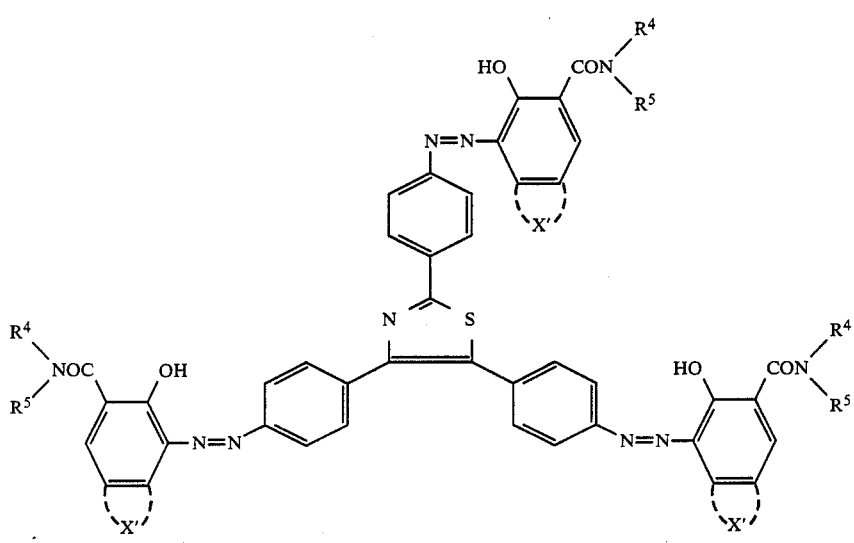

(4)

wherein X' represents a benzene ring, a naphthalene ring, a carbazole ring or a dibenzofuran ring; and $R^4$ and $R^5$, which may be the same or different, each represents a hydrogen atom, an alkyl group, an aromatic group, a heteroaromatic group or a substituted alkyl group, aromatic group or heteroaromatic group, provided that $R^4$ and $R^5$ are not both hydrogen atoms, and $R^5$ is not a hydrogen atom when Y is

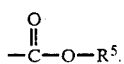

5. The electrophotographic light-sensitive material claimed in claim 2, wherein said layer further comprises a binder.

6. The electrophotographic light-sensitive material claimed in claim 3, wherein said electric charge carrier generating layer contains said trisazo compound as a major component, and said electric charge carrier transport layer is provided on said electric charge carrier generating layer.

7. The electrophotograhic light-sensitive material claimed in claim 2, wherein said layer has a thickness of about 3 to 30μ.

8. The electrophotographic light-sensitive material claimed in claim 7, wherein said layer has a thickness of about 5 to 20μ.

9. The electrophotographic light-sensitive material claimed in claim 6, wherein said electric charge carrier generating layer has a thickness of from 0.01 to 4μ, and said electric charge carrier transport layer has a thickness of from about 3 to 30μ.

10. The electrophotographic light-sensitive material claimed in claim 9, wherein said electric charge carrier generating layer has a thickness of from about 0.1 to 2μ, and said electric charge carrier transport layer has a thickness of from about 5 to 20μ.

11. The electrophotographic light-sensitive material claimed in claim 2, wherein said layer further contains a binder and said trisazo compound is present in said layer in an amount of from about 0.01 to 2 times the amount of said binder by weight, and said electric charge carrier transport compound is present in an amount of from about 0.1 to 2 times the amount of said binder by weight.

12. The electrophotographic light-sensitive material claimed in claim 11, wherein the amount of said trisazo compound in said layer is from about 0.05 to 1 time the amount of said binder by weight, and the amount of said electric charge carrier transport compound in said layer is from about 0.3 to 1.3 times the amount of said binder by weight.

13. The electrophotographic light-sensitive material claimed in claim 2, wherein said trisazo compound is present in an amount of from about 0.01 to 0.5 time the amount of said electric charge carrier transport compound by weight.

14. The electrophotographic light-sensitive material claimed in claim 3, wherein said electric charge carrier generating layer further contains a binder, the amount of said trisazo compound being from about 0.1 to 20 times the amount of said binder by weight, and said electric charge carrier transport layer further contains a binder, the amount of said electric charge carrier transport compound being from about 0.2 to 2 times the amount of said binder by weight.

15. The electrophotographic light-sensitive material claimed in claim 14, wherein the amount of said trisazo compound in said electric charge carrier generating layer is from about 0.2 to 5 times the amount of said binder by weight, and the amount of said electric charge carrier transport compound in said electric charge carrier transport layer is from about 0.3 to 1.3 times the amount of said binder by weight.

* * * * *